E. C. & E. E. GOSSETT.
SAFETY ATTACHMENT FOR TROLLEY POLES.
APPLICATION FILED OCT. 14, 1913.
1,110,485.
Patented Sept. 15, 1914.
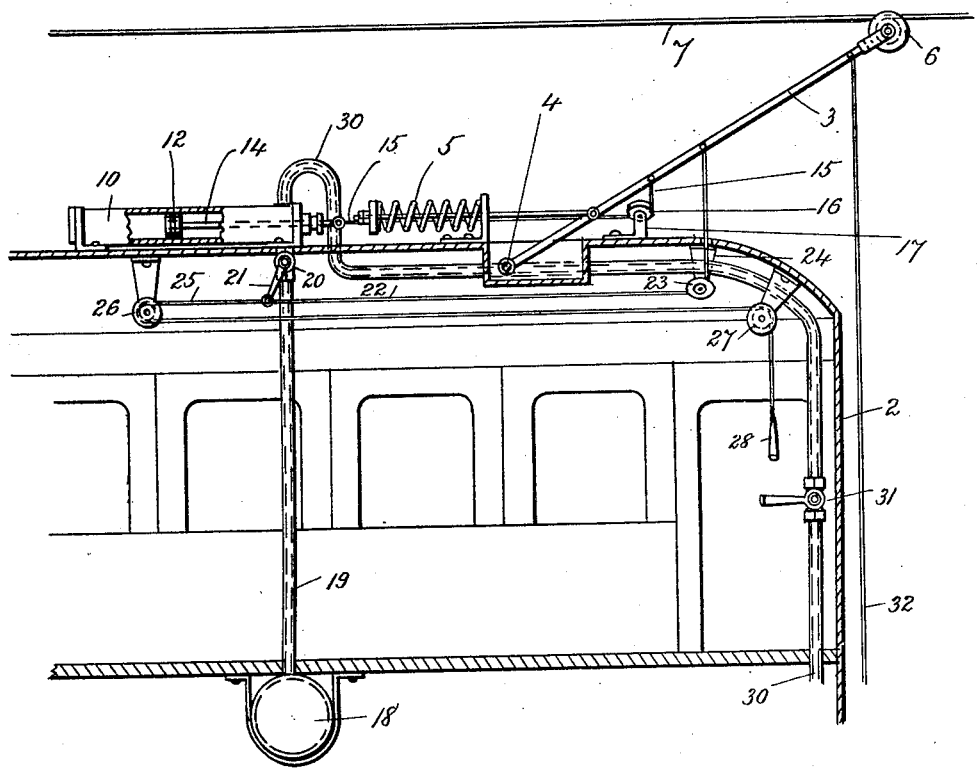
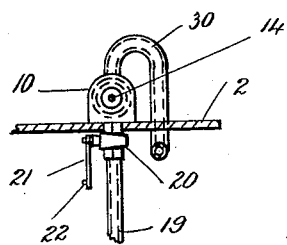

UNITED STATES PATENT OFFICE.

EDGAR C. GOSSETT AND ERNEST E. GOSSETT, OF JACKSON, GEORGIA.

SAFETY ATTACHMENT FOR TROLLEY-POLES.

1,110,485. Specification of Letters Patent. Patented Sept. 15, 1914.

Application filed October 14, 1913. Serial No. 795,136.

*To all whom it may concern:*

Be it known that we, EDGAR C. GOSSETT and ERNEST E. GOSSETT, citizens of the United States, residing at Jackson, in the county of Butts and State of Georgia, have invented certain new and useful Improvements in Safety Attachments for Trolley-Poles; and we do hereby declare the following to be a full, clear, and exact description of the invention, such as will enable others skilled in the art to which it appertains to make and use the same.

This invention relates to safety attachments for the trolley poles of electric railroad cars; and it consists of a pneumatic device which automatically pulls down the trolley pole below the level of the line wire and its attachments or connections when the trolley sheave accidentally leaves the line wire and springs upwardly.

In the drawings, Figure 1 is a longitudinal section through a portion of an electric trolley car provided with a safety attachment according to this invention. Fig. 2 is an end view of the pneumatic cylinder showing the inlet pipe and its valve and also the outlet pipe.

The body 2 of the car is of any approved construction, and the trolley pole 3 is pivotally supported from the roof of the car on a pivot 4, and is provided with a spring 5 which holds the trolley pole in an inclined position with the trolley sheave 6 bearing against the line wire 7. All of these parts are of any approved construction. When the car is going at a high speed and the trolley wheel accidentally leaves the line wire, the trolley pole is moved upwardly by the spring, and the trolley sheave and pole frequently strike the line wire supports and damage is occasioned.

In order to obviate the liability to damage, and to pull down the trolley pole as soon as the trolley sheave leaves the line wire and moves upwardly, a pneumatic cylinder 10 is secured to the roof of the car and is provided with a piston 12 and a piston-rod 14. The piston-rod 14 is connected to the trolley pole 3 by a cord or other flexible connection 15 which passes over a guide sheave 16 journaled in a bracket 17, which is secured to the roof of the car. A reservoir 18 for compressed air is provided, and is arranged at any convenient part of the car, and is supplied with compressed air by any approved means. The reservoir 18 is connected to the cylinder 10 by a supply pipe 19 having an air-inlet valve 20 provided with an operating lever 21. The lever 21 is connected with the trolley pole by a cord 22 which passes over a guide sheave 23. The guide sheave 23 is journaled in a bracket 24 which is secured to the roof of the car. A second cord 25 is also secured to the lever 21 and passes over guide sheaves 26 and 27 journaled at suitable points and supported from the car roof or body. The free end of the cord 25 has a handle 28 which is arranged at one end of the car, or wherever it can be conveniently operated by the conductor or motor-man. The cylinder 10 is provided with an outlet pipe 30 having an outlet valve 31 which is operated by hand, and which is arranged in convenient proximity to the handle 28. A cord 32 is provided for guiding the trolley pole and replacing the trolley sheave in engagement with the line wire in the usual manner.

Both valves 31 and 20 are normally closed. When the trolley sheave accidentally leaves the line wire, and the spring 5 raises the trolley pole, the upward movement of the trolley pole pulls the cord 22 and opens the air-inlet valve 20. The compressed air from the reservoir then enters the cylinder and pulls down the trolley pole by means of the piston-rod and the cord 15, and holds the trolley sheave below the level of the line wire, so that no damage can result, as the trolley pole or sheave can not strike any of the line wire supports or connections. When the car has been brought to a standstill, or under control, the air-supply valve 20 is closed by pulling the cord 25. The valve 31 is then opened by hand to let out the compressed air from the cylinder, and the trolley sheave is guided back into engagement with the line wire by means of the cord 32.

What we claim is:

1. The combination, with a car body, and a trolley pole pivoted thereto and provided with means for moving it upwardly; of a cylinder for compressed air secured to the car body and provided with a piston and a piston-rod, a flexible connection between the piston-rod and the trolley pole, an inlet valve secured to the cylinder, and a flexible connection operatively connecting the inlet valve with the trolley pole, whereby the inlet valve is opened when the trolley leaves the line wire to cause the piston to pull down the trolley pole.

2. The combination, with a car body, and a trolley pole pivoted thereto and provided with means for moving it upwardly; of a cylinder for compressed air secured to the car body and provided with a piston and a piston-rod, a flexible connection between the piston-rod and the trolley pole, an inlet valve secured to the cylinder, an outlet valve for compressed air operated by hand and connected to the said cylinder, means for closing the air inlet valve by hand, and a flexible connection operatively connecting the inlet valve with the trolley pole, whereby the inlet valve is opened when the trolley leaves the line wire to cause the piston to pull down the trolley pole.

In testimony whereof we affix our signatures, in presence of two witnesses.

EDGAR C. GOSSETT.
ERNEST E. GOSSETT.

Witnesses to the signature of Edgar C. Gossett:
    WINDER P. MONROE,
    R. L. TAPF.

Witnesses to the signature of Ernest E. Gossett:
    C. H. THORNTON,
    S. J. FOSTER.

---

Copies of this patent may be obtained for five cents each, by addressing the " Commissioner of Patents, Washington, D. C."